May 8, 1934. H. G. KAMRATH 1,958,047
VENTILATING APPARATUS FOR DYNAMO-ELECTRIC MACHINES
Filed Dec. 17, 1927 2 Sheets-Sheet 1

Inventor
Herbert G. Kamrath
By Blackmore, Spencer & Hiuh
Attorneys

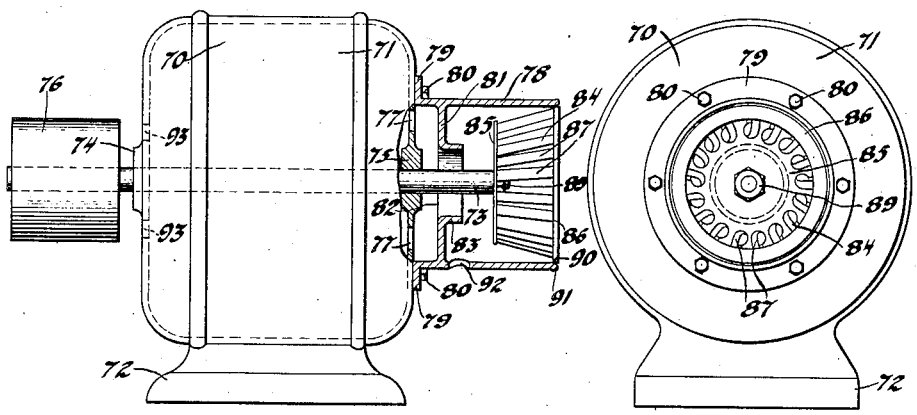

Patented May 8, 1934

1,958,047

UNITED STATES PATENT OFFICE 1,958,047

VENTILATING APPARATUS FOR DYNAMO-ELECTRIC MACHINES

Herbert G. Kamrath, Flint, Mich., assignor to A C Spark Plug Company, Flint, Mich., a company of Michigan Application December 17, 1927, Serial No. 240,778

10 Claims. (Cl. 171—252)

This invention relates to means for cooling the working parts of electric motors, generators and similar machines of the type in which the working parts are enclosed in a casing.

It is customary to construct electric motors, generators, and similar machines so that air may circulate through the interior of the machine to cool the working parts thereof. When such a machine is exposed to dust-laden air, some of the dust in the air is deposited inside of the machine and may cause a short circuit and/or other troubles. In order to prevent the introduction of dust-laden air into the machine and the consequent precipitation of dust on the working parts thereof, machines of the type described have been, in some cases, provided with air tight casings which prevented the entrance of air and consequently dust into the interior thereof but made the machine dependent entirely on radiation from the outside of the casing for dissipating the heat generated within. In order to properly cool such a machine, it is necessary to make the casing considerably larger than is necessary merely to enclose the working parts in order to provide sufficient radiation surface. In many cases, such a bulky motor is inconvenient, if not impractical. In other cases, clean air for a number of motors has been distributed from a central source. This system is cumbersome and expensive and is not always suitable.

It is an object of this invention to provide ventilating apparatus for an electric motor, generator or similar machine which overcomes the defects of the systems mentioned above.

It is another object of the invention to provide in combination with an electric motor, generator or similar machine having a casing, a fan on the rotating shaft of the machine to circulate air through the interior of the casing, and means to remove dirt from the air before the latter enters the casing.

It is another object of the invention to provide in combination with an electric motor, generator or similar machine having a casing, a combined air cleaner and blower whose moving part or parts are driven by the rotatable shaft of the machine, to clean air and circulate the cleaned air through the interior of the casing.

It is another object of the invention to provide certain new and useful improvements in air cleaners.

Other objects of the invention will be apparent from a perusal of the following specification in which the embodiments of my invention shown in the accompanying drawings are described.

In the drawings:

Figure 7 is a side elevation with parts broken away and in section of an electric motor in which is incorporated a third form of my combined air cleaning and ventilating apparatus.

Figure 8 is an end elevation of the apparatus shown in Figure 7.

Figure 9 is an end elevation of the fan or blower which forms an element of the combined air cleaning and ventilating apparatus shown in Figures 7 and 8.

Figure 10 is a side elevation of the fan or blower shown in Figure 9.

Figure 11 is a longitudinal section, taken on the line 11—11 of Figure 12, through an electric motor in which is incorporated a fourth form of my combined air cleaning and ventilating apparatus.

Figure 12 is a section taken on the line 12—12 of Figure 11.

Figure 13 is an end elevation of the vane plate which is an element of the combined air cleaning and ventilating apparatus shown in Figures 11 and 12.

Figure 1:
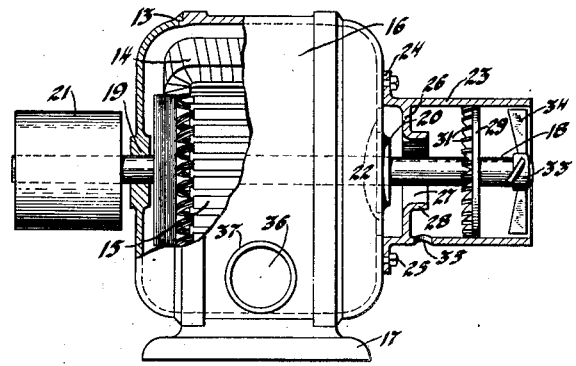
Figure 1 is a side elevation with parts broken away and in section of an electric motor in which is incorporated one form of my combined air cleaning and ventilating apparatus.

In Figures 1-4 of the drawings, the reference character 13 indicates an electric motor, including field coils 14 and an armature 15, enclosed in a casing 16 which is supported by the base 17. The armature of the motor is carried by the shaft 18 which is journalled in bearings 19 and 20 at opposite ends of the casing and projects therethrough at both ends. To one projecting end of the shaft is secured an ordinary pulley 21 in any desired manner.

In the end of the casing distant from the pulley 21 and adjacent and surrounding the bearing 20, there are provided openings 22 through which air may pass into the interior of the casing. Enclosing the openings 22 and coaxial with and surrounding the projecting end of the shaft 18 opposite that carrying the pulley 21 is a cylindrical housing 23 which is secured at one end to the casing through the flange 24 by means of the screws 25, and is open at its opposite end to the atmosphere. Within the housing adjacent the casing, there is provided a circular plate 26 which is circumferentially secured in any desired manner to the side walls of the housing. The plate 26 is provided with a large central opening 27, and, on its side distant from the casing, with a circumferential flange or collar 28 surrounding the opening and coaxial with and surrounding but spaced from the shaft 18. Within the housing and spaced outwardly of the flange 28 is a plate 29 which is circumferentially secured to the side walls of the housing in any desired manner and provided with a central opening 30 through which the shaft 18 projects. Between its central opening and its circumference the plate 29 is provided with an annular series of inwardly directed, struck-out vanes 31 and adjacent openings 32. Within the housing outwardly of the plate 29, there is provided a hub 33 which is secured to the shaft 18 so as to rotate therewith and carries propeller type fan blades 34.

In the lower side wall of the housing 23 and substantially beneath the flange 28, there is provided a tangential dirt discharge opening 35, and in the side wall of the motor casing, substantially midway between its ends, there is provided a tangential air discharge orifice 36 opening into a tangential air discharge conduit 37.

When the motor starts, the blades 34 rotate and draw air into the housing 23, and then force it through the openings 32, in the vane plate. After passing through the openings 32 the air impinges against the vanes 31, which give it a helical motion which throws the dirt particles to the outside and finally, accompanied by a small amount of air, out of the housing 23 through the opening 35. The cleaned air passes through the opening 27 in the plate 26, then through the openings 22 into the interior of the motor casing, and then travels through the casing, passing over and cooling the field coils, armature, brushes and commutator, and is finally discharged from the casing through the opening 36 and the conduit 37.

The position and size of the opening 27 in the plate 26 insures that all of the air forced into the motor casing will be taken from the center of the air stream where the air is cleanest. The flange 28 on the plate 26 prevents any dirt which has been thrown to the outside of the air stream by centrifugal action from returning to the center of the stream—by eddy currents or otherwise—and passing through the opening 27.

Figure 5:
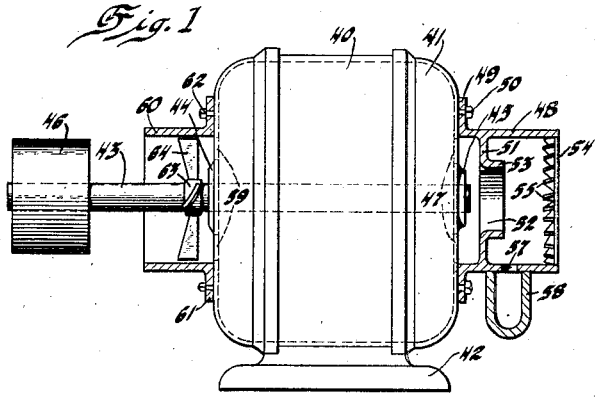
Figure 5 is a side elevation with parts in longitudinal section of an electric motor in which is incorporated a second form of my combined air cleaning and ventilating apparatus.
Figure 6:
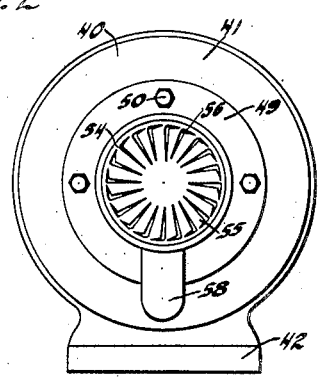
Figure 6 is an end elevation of the apparatus shown in Figure 5.
Figure 3:
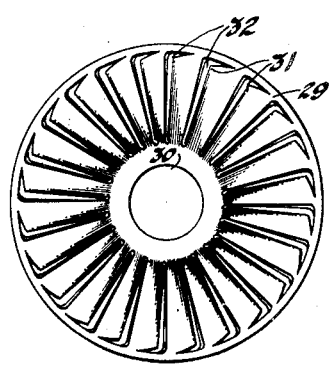
Figure 3 is an end elevation of the vane plate which is an element of the combined air cleaning and ventilating apparatus shown in Figures 1 and 2.
Figure 4:
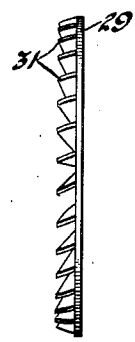
Figure 4 is a side elevation of the vane plate shown in Figure 3.

In Figures 5 and 6 of the drawings, the reference character 40 indicates an electric motor including field coils and an armature enclosed in a casing 41 which is supported by a base 42. The armature of the motor is carried by a shaft 43 which is journalled in bearings 44 and 45 at opposite ends of the casing and projects therethrough at one end. To the projecting end of the shaft is secured an ordinary pulley 46 in any desired manner.

In the end of the casing distant from the pulley 46 and adjacent and surrounding the bearing 45 are provided openings 47 through which air may enter the interior of the casing. Enclosing the openings 47 and coaxial with the shaft 43 is a cylindrical housing 48 which is secured at one end to the casing through the flange 49 by means of the screws 50 and is open at its opposite end to the amosphere. Within the housing 48 adjacent the casing, there is provided a circular plate 51 which is circumferentially secured in any desired manner to the side walls of the housing. The plate 51 is provided with a large central opening 52 and, on its side distant from the motor casing, with a circumferential flange or collar 53 surrounding the opening. Within the housing 48 spaced outwardly of the flange 53 and adjacent the open end of the housing is a plate 54 which is circumferentially secured to the side walls of the housing in any desired manner and is provided between its circumference and its center with a series of inwardly directed struck-out vanes 55 and adjacent openings 56. The plate 54 is identical with the plate 29 except that it is not provided with a central opening since this is unnecessary as the shaft of the motor does not pass through it.

In the lower side of the housing 48 and substantially beneath the flange 53, there is provided a dirt discharge opening 57 which leads into a dirt receptacle 58, which may be detached from the housing 48 to permit removal of the dust therefrom.

In the end of the motor casing adjacent the pulley 46 and adjacent and surrounding the bearing 44 are provided openings 59 through which air may be discharged from the interior of the casing. Located between the pulley 46 and the casing, enclosing the openings 59, and coaxial with and surrounding a portion of the projecting end of the shaft 43 is a cylindrical housing 60 which is secured at one end to the casing through the flange 61 by means of the screws 62 and is open at its opposite end to the atmosphere. Secured to the shaft 43 so as to rotate therewith is a hub 63 carrying propeller type fan blades 64 located within the housing 60 adjacent the motor casing.

When the motor shown in Figures 5 and 6 starts, the fan blades 64 rotate, and air is drawn through the openings 56 in the vane plate and against the vanes 55, which give it a helical motion which throws the dirt to the outside and finally, through the opening 57, out of the housing 48 and into the receptacle 58, which may be emptied at intervals. The cleaned air passes through the opening 52 in the plate 51 and through the openings 47 into the interior of the casing where it passes over and cools the field coils, armature, commutator and brushes and is then drawn out of the casing through the openings 59 into housing 60 by the blades 64 which then discharge it into the atmosphere.

Figure 2:
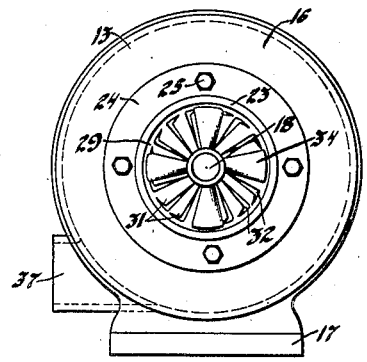
Figure 2 is an end elevation of the apparatus shown in Figure 1.

The action of the plate 51 and the flange 53 surrounding the opening therein is the same as that of the similar and corresponding parts in Figures 1 and 2.

In Figures 7–10 of the drawings, the reference character 70 indicates an electric motor which includes field coils and an armature enclosed in a casing 71 which is supported by the base 72. The armature of the motor is carried by the shaft 73 which is journalled in bearings 74 and 75 at opposite ends of the casing and projects therethrough at both ends. To one projecting end of the shaft is secured an ordinary pulley 76.

In the end of the casing distant from the pulley 76 and adjacent and surrounding the bearing 75, there are provided openings 77 through which air may enter the interior of the motor casing. Enclosing the openings 77 and coaxial with and surrounding the projecting end of the shaft 73 opposite that carrying the pulley 76 is a cylindrical housing 78 which is secured at one end to the casing through the flange 79 by means of the screws 80, and is open at its opposite end to the atmosphere. Within the housing adjacent the casing, there is provided a circular plate 81 which is circumferentially secured in any desired manner to the side wall of the housing. The plate 81 is provided with a large central opening 82, and, on its side distant from the casing, with a circumferential flange or collar 83 surrounding the opening and coaxial with and surrounding but spaced from the shaft 73.

Within the housing is located the fan or blower 84 which in this case is of the centrifugal squirrel-cage type. The fan or blower consists of a circular plate 85, which is appreciably smaller in diameter than the interior of the housing, and an annulus 86 which is slightly larger in diameter than the interior of the housing, which are spaced apart and connected by a series of circumferentially spaced concave blades 87. On each end of each blade 87, there is provided a flange 88. One of the flanges on each blade is rigidly secured to the plate 85 adjacent its circumference, and the other is rigidly secured to the annulus adjacent its circumference. The fan is secured to the shaft so as to rotate therewith by means of the screw 89 which passes through a central aperture in the plate 85. As is shown in the drawings, the annulus 86 has a bevelled circumferential edge 90 which, when the fan is secured to the shaft, is in close juxtaposition to but spaced from the bevelled flange 91 on the outer end of the housing so as to allow relative movement of the two parts upon rotation of the shaft 73, but prevent as much as practicable leakage of air between the outer edge of the annulus and the inner circumference of the housing.

In the lower side of the housing 78 substantially beneath the flange 83, there is provided a tangential dirt discharge opening 92, and in the end of the motor casing adjacent the pulley 76 and adjacent and surrounding the bearing 74 are provided openings 93 through which air may be discharged from the interior of the casing.

When the motor shown in Figures 7–10 starts, the fan 84 rotates and draws air into its interior through the central opening in the annulus 86 and then discharges it tangentially into the housing 78 where it assumes a helical motion which throws the dirt to the outside and finally, accompanied by a little air, out of the housing through the opening 92. The cleaned air passes through the opening 82 in the plate 81, and then through the openings 77 into the interior of the motor casing where it passes over the field coils, armature, brushes and commutator and then is discharged from the casing through the openings 93. The plate 81 and the flange 83 have the same function as the similar and corresponding parts in Figures 1 and 2 and Figures 5 and 6.

In Figures 11–13 of the drawings the reference character 100 indicates an electric motor including a stator 101 and a rotor 102 enclosed in a casing 103 which is supported by a base 104. The stator is secured to the casing but is spaced therefrom at points such as 105 to provide channels for the circulation of air between the two parts.

The rotor 102 is carried by the shaft 106 which is journalled in bearings 107 and 108 at opposite ends of the casing and projects therethrough at one end. On the outer extremity of the projecting end of the shaft, there is secured a pulley 109 in any desired manner.

The opposite ends of the motor casing are provided with openings 110 and 111, adjacent and surrounding the bearings 107 and 108, respectively, for the intake and discharge, respectively, of air from the interior of the casing. Secured to the end of the casing distant from the pulley 109 is a cup-shaped housing 112 of substantially the same diameter as the casing, which encloses the openings 110 and is provided with an opening 113 coaxial with the shaft 106. Within this opening is secured a plate 114 which is provided between its center and its circumference with a series of inwardly directed, struckout vanes 115 and adjacent openings 116. On its lower side, the housing 112 is provided with an opening 117, normally closed by the screw-plug 118, through which dirt may be removed from the housing 112.

Secured to the end of the casing adjacent the pulley 109 and inwardly thereof is a second cup-shaped housing 119 which encloses the openings 111 and is provided with an opening 120 through which the shaft 106 projects. The housing 119 is also provided with a tangential air discharge orifice 121 opening into a tangentially disposed air discharge conduit 122. Within the housing 119 and secured to the shaft 106 so as to rotate therewith is a hub 123 carrying centrifugal fan blades 124.

It is obvious that if desired the vane plate 114 may be made integral with the housing 112.

When the motor shown in Figures 11–13 starts, the blades 124 rotate and air is drawn through the openings 116 and impinges against the vanes 115 which give it a helical motion within the housing 112, which throws the dirt to the outside where it settles to the bottom of the housing, as indicated at 125, whence it may be withdrawn at intervals through the opening 117 by removing the screw 118. The clean air passes through the openings 110 into the interior of the motor casing and travels therethrough—some of it passing between the casing and the stator through the channels 105, and some between the stator and the rotor—cooling the parts within the casing, and then passing out of the casing through the openings 111 into the housing 119, from which it is discharged into the atmosphere through the opening 121 and the conduit 122.

It is preferable that the casings of all of the motors shown shall be air-tight except at the points at which the air intake and air discharge openings are provided. This is particularly desirable in connection with the forms of the invention shown in Figures 5 and 6 and Figures 11–13 to prevent air being introduced into the casing at points where it will not be subjected to the action of the cleaner, but is not so essential in connection with the remaining forms, as in these the air in the casing is under super-atmospheric pressure and air will leak out instead of being drawn into the casing through the leaks.

In each of the devices shown in Figures 1–10, the part described as the combined air cleaning and ventilating apparatus including the housing or housings and the parts attached thereto and enclosed therein, with the exception of the motor casing and the armature shaft, are readily attachable to or detachable from the motor, and may be applied to practically any existing motor whose working parts are enclosed in a casing. The form of combined air cleaning and ventilating apparatus shown in Figures 11–13, while it may be made detachable, is intended primarily for incorporation in new motors.

It is to be understood that, while the air intake and discharge openings in the casings of the various motors have been described as located at certain points, they may be located elsewhere if more expedient.

It is also to be understood that though I have described my combined air cleaning and ventilating apparatus as applied to an electric motor, it may equally well be applied to any of the various machines of similar construction, such as generators and rotary converters.

I claim:

1. The combination, with an electric machine which includes a casing provided with air intake and air discharge openings, and a rotatable shaft within the casing and projecting therethrough at one end, of a housing secured to the casing around the air intake openings and coaxial with and surrounding a portion of the projecting end of the shaft, a dust discharge opening in a side wall of the housing, and a squirrel-cage type fan within the housing and secured to the projecting end of the shaft.

2. The combination, with an electric machine which includes a rotor, a stator, and a casing enclosing the rotor and the stator, of means associated with the rotor to effect an inertia separation of foreign matter from air and to circulate the cleansed air through the interior of the casing.

3. The combination, with an electric machine which includes a casing having therethrough air intake and air discharge openings, and a rotatable shaft within the casing and projecting therethrough at one end, of a housing surrounding the projecting end of the shaft and the air intake openings, and means associated with the shaft and located within the housing to effect an inertia separation of foreign matter from air and to circulate the cleaned air through the interior of the casing.

4. In a combined air cleaner and blower, a rotatable shaft, a housing surrounding a portion of the shaft and having in one end thereof a reduced air discharge opening and a collar surrounding the opening and projecting into the housing, means on the shaft within the housing to cause air to travel through the housing in a helical path, and a dirt discharge opening in a side wall of the housing.

5. The combination, with an electric machine which includes a rotor, a stator, and a casing enclosing the rotor and stator, of means associated with the rotor to effect an inertia separation of foreign matter from air and to circulate the cleaned air over the machine so as to cool the working parts thereof.

6. The combination, with an electric machine which includes a rotor, a stator, and a casing enclosing the rotor and the stator, of means mounted on the rotor to effect an inertia separation of foreign matter from air and to circulate the cleaned air over the machine so as to cool the working parts thereof.

7. The combination, with an electric machine which includes a casing and a rotatable shaft within the casing and projecting therethrough at one end, of a housing surrounding the projecting end of the shaft, and means associated with the shaft and located within the housing to effect an inertia separation of foreign matter from air and to circulate the cleaned air over the machine so as to cool the working parts thereof.

8. The combination, with an electric machine which includes a casing, and a rotatable shaft within the casing and projecting therethrough at one end, of a housing surrounding the projecting end of the shaft, and means mounted on the projecting end of the shaft and located within the housing to effect an inertia separation of foreign matter from air and to circulate the cleaned air over the machine so as to cool the working parts thereof.

9. In an electric machine which includes a rotor, a stator, and a casing enclosing the rotor and the stator, an air cleaning chamber associated with the casing, means in the chamber and associated with the rotor to circulate air through the chamber, to effect an inertia separation of foreign matter from the air within the chamber, and to circulate the cleaned air over the machine so as to cool the working parts thereof.

10. In an electric machine which includes a rotor, a stator, and a casing enclosing the rotor and the stator, an air cleaning chamber associated with the casing, means mounted on the rotor and located in the chamber to circulate air through the chamber, to effect an inertia separation of foreign matter from the air within the chamber, and to circulate the cleaned air over the machine so as to cool the working parts thereof.

HERBERT G. KAMRATH.